(12) United States Patent
Robinson et al.

(10) Patent No.: US 9,140,605 B2
(45) Date of Patent: Sep. 22, 2015

(54) CONFIGURABLE COMBINATION SPECTROMETER AND IMAGER

(71) Applicant: RAYTHEON COMPANY, Waltham, MA (US)

(72) Inventors: Ian S. Robinson, Redondo Beach, CA (US); John D. Bloomer, Redondo Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 26 days.

(21) Appl. No.: 14/166,067

(22) Filed: Jan. 28, 2014

(65) Prior Publication Data

US 2015/0211926 A1    Jul. 30, 2015

(51) Int. Cl.
*G01J 3/45* (2006.01)
*G01J 3/28* (2006.01)
*G01J 3/26* (2006.01)

(52) U.S. Cl.
CPC .............. *G01J 3/2823* (2013.01); *G01J 3/26* (2013.01); *G01J 3/45* (2013.01)

(58) Field of Classification Search
CPC ............ G01J 3/26; G01J 3/2823; G01J 3/45; G01J 3/4535
See application file for complete search history.

(56) References Cited

U.S. PATENT DOCUMENTS

| | | | |
|---|---|---|---|
| 5,528,368 A * | 6/1996 | Lewis et al. | 356/456 |
| 5,539,518 A | 7/1996 | Bennett | |
| 7,382,498 B1 * | 6/2008 | Cook | 356/328 |
| 8,203,715 B2 | 6/2012 | Robinson | |
| 2007/0146720 A1 * | 6/2007 | Cox et al. | 356/451 |
| 2010/0018289 A1 | 1/2010 | Oda | |
| 2010/0290053 A1 * | 11/2010 | Robinson | 356/451 |

* cited by examiner

*Primary Examiner* — Kara E Geisel
*Assistant Examiner* — Dominic J Bologna
(74) *Attorney, Agent, or Firm* — Lando & Anastasi, LLP

(57) ABSTRACT

An imaging transform spectrometer, and method of operation thereof, that is dynamically configurable "on demand" between an interferometric spectrometer function and a broadband spatial imaging function to allow a single instrument to capture both broadband spatial imagery and spectral data of a scene. In one example, the imaging transform spectrometer is configured such that the modulation used for interferometric imaging may be dynamically turned ON and OFF to select a desired mode of operation for the instrument.

14 Claims, 5 Drawing Sheets

CONFIGURABLE COMBINATION SPECTROMETER AND IMAGER

BACKGROUND

Many broadband imagers are fielded in ground-based and airborne imaging systems. However, particularly for systems operating in the long-wave infrared (LWIR) spectral band, it can be difficult to obtain images with many pixels on a target, as may be needed to identify the target.

An alternative to broadband imaging is imaging spectroscopy. Spectral imagery may identify a target with as few as one pixel on the target. One type of interferometric spectrometer used to supply spectral data for many remote sensing applications is called a Fourier Transform Spectrometer (FTS). A common form of an FTS employs a Michelson interferometer with one arm having a variable optical path length. The variable optical path length may be implemented using a movable mirror. By scanning the movable mirror over some distance, an interference pattern or interferogram is produced that encodes the spectrum of the source. The FTS uses the Discrete Fourier Transform (DFT) or its faster algorithm, the Fast Fourier Transform (FFT), to convert the auto-correlation (each spectral amplitude encoded as the amplitude of a cosine signal) to physical spectra. The encoded spectrum is the Fourier transform of the source.

Referring to FIG. 1A, there is illustrated a block diagram of one example of an optical configuration of an FTS using a scanning Michelson interferometer implemented with a movable mirror. In this example, the FTS includes two mirrors 105, 110 with a beamsplitter 115 positioned between them. Mirror 105 is a fixed mirror and mirror 110 is a movable mirror. Electromagnetic radiation 120 incident on the beamsplitter 115 from a radiation source (not shown) is divided into two parts, each of which propagates down one of the two arms and is reflected off one of the mirrors. Radiation 120a in a first optical path is reflected by the beamsplitter 115 and reflected by the fixed mirror 105. On the return, the radiation 120a is again split by the beamsplitter 115, such that 50% of the radiation is reflected back to the input, and the remainder is transmitter through the beamsplitter to a focal plane array 125. Radiation 120b in a second optical path is transmitted through the beamsplitter 115, and reflected by the movable mirror 110 which imparts a modulation to the radiation (motion of the mirror 110 is indicated by arrow 130). On the return, the radiation 120b is also again split by the beamsplitter 115 such that 50% of the radiation is transmitted through the beamsplitter back to the input, and the remainder is reflected to the focal plane array 125. The two beams are recombined at the focal plane array 125. When the position of the movable mirror 110 is varied along the axis of the corresponding arm (indicated by arrow 130), an interference pattern, or interferogram, is swept out at the focal plane array 125 as the two phase-shifted beams interfere with each other.

FIG. 1B illustrates an alternative configuration of an FTS. In this configuration, two focal plane arrays 125a, 125b are used, and the fixed mirror 105 and moving mirror 110 are oriented such that approximately 50% of the radiation 120a, 120b from each optical path is directed to each focal plane array. The spectra from each focal plane array 125a, 125b may be averaged to improve the overall signal-to-noise ratio. This configuration avoids the radiation loss associated with the configuration of FIG. 1A, but is more complex and requires additional components.

SUMMARY OF INVENTION

Aspects and embodiments are directed to an imaging transform spectrometer having the added capability of programmable elimination of the modulation used for interferometric imaging to allow broadband images to be obtained on-demand with the same instrument.

According to one embodiment, a multimode imaging transform spectrometer having a spectral collection mode and a camera mode comprises a beamsplitter configured to split incident electromagnetic radiation from a scene into a first optical path and a second optical path, at least one focal plane array sensor configured to receive electromagnetic radiation from the first and second optical paths, a first mirror positioned in the first optical path and configured to reflect electromagnetic radiation in the first optical path toward the at least one focal plane array sensor, a movable second mirror positioned in the second optical path and configured to reflect electromagnetic radiation in the second optical path toward the at least one focal plane array sensor, the second mirror being movable over a scan range to provide an optical path length difference between the first optical path and the second optical path and produce an interferogram at the least one focal plane array sensor when the imaging transform spectrometer is in the spectral collection mode, and a controller configured to selectively interrupt scanning movement of the second mirror over the scan range to configure the imaging transform spectrometer into the camera mode, wherein, in the camera mode, the at least one focal plane array sensor is configured to produce broadband spatial images of the scene from the electromagnetic radiation from the first and second optical paths.

In one example, multimode imaging transform spectrometer includes two focal plane arrays sensors each configured to receive the electromagnetic radiation from the first and second optical paths. In one example, the controller is configured to selectively interrupt the scanning movement of the second mirror and move the second mirror to a zero path difference position in which the optical path length difference between the first optical path and the second optical path is substantially zero so as to substantially prevent formation of the interferogram at the at least one focal plane array sensor in the camera mode of the imaging transform spectrometer. The multimode imaging transform spectrometer may further comprise a random amplitude driver coupled to the controller and to one of the first mirror and the second mirror, wherein the controller is configured to halt the scanning movement of the second mirror over the scan range, and wherein the controller is further configured to control the random amplitude driver to impart a vibration to the one of the first mirror and the second mirror while the scanning movement of the second mirror over the scan range is halted to substantially prevent formation of the interferogram at the at least one focal plane array sensor. In one example, the random amplitude driver is coupled to the first mirror. In another example, the random amplitude driver is coupled to the second mirror. The multimode imaging transform spectrometer may further comprise an analyzer coupled to the at least one focal plane array sensor and configured to receive image frames from the at least one focal plane array sensor. In the spectral collection mode, the analyzer may be configured to sample the interferogram to generate a plurality of measured samples having a measured sample spacing associated therewith, and using cosine estimation at the measured sample spacing to determine amplitudes associated with frequencies uniquely associated with features of spectral data in the plurality of measured samples. In another example, the controller is configured control the analyzer to ignore image frames received from the at least one focal plane array sensor when the imaging transform spectrometer is in the camera mode.

According to another embodiment, a multimode imaging transform spectrometer comprises a first focal plane array sensor, a second focal plane array sensor, a beamsplitter configured to split incident electromagnetic radiation from a scene into a first optical path and a second optical path, a first mirror positioned in the first optical path and configured to reflect electromagnetic radiation in the first optical path toward each of the first focal plane array sensor and the second focal plane array sensor, a movable second mirror positioned in the second optical path and configured to reflect electromagnetic radiation in the second optical path toward the first and second focal plane array sensors, the second mirror being movable over a scan range to provide an optical path length difference between the first optical path and the second optical path and produce an interferogram at each of the first and second focal plane array sensors, a random amplitude driver coupled to one of the first mirror and the second mirror and configured to impart a vibration to the one of the first mirror and the second mirror, an analyzer coupled to the first and second focal plane array sensors, and a controller coupled to the second mirror and to the random amplitude driver, and configured to selectively halt scanning movement of the second mirror over the scan range and to control the random amplitude driver to impart the vibration to the one of the first mirror and the second mirror while the scanning movement of the second mirror is halted, so as to substantially prevent formation of the interferogram at the first and second focal plane array sensors, wherein, in the camera mode of the multimode imaging transform spectrometer in which the scanning movement of the second mirror is halted, the first and second focal plane array sensors are configured to produce broadband spatial images of the scene from the electromagnetic radiation in the first and second optical paths, and wherein, in a spectral collection mode of the multimode imaging transform spectrometer, analyzer is configured to produce spectral data from the interferograms produced at the first and second focal plane array sensors.

In one example, the random amplitude driver is coupled to the first mirror. In another example, the random amplitude driver is coupled to the second mirror. In one example, to configure the multimode imaging transform spectrometer into the camera mode, the controller is further configured to move, within a spectral scan, the second mirror to a zero path difference position in which the optical path length difference between the first optical path and the second optical path is substantially zero, and to halt the scanning movement of the second mirror at the zero path difference position. The controller may be further configured to adaptively determine the zero path difference position. The analyzer may be configured to track the scanning movement of the second mirror, and in the spectral collection mode of the multimode imaging transform spectrometer, to use knowledge of a position of the second mirror in the scan range to analyze the interferogram produced at the first and second focal plane array sensors.

According to another embodiment, an imaging method comprises selectively producing spectral data from electromagnetic radiation received from a scene by a spectrometer including an interferometer by selectively using the interferometer to form an interference pattern at a focal plane array sensor, sampling, at the interferometer, the interference pattern to generate a plurality of measured samples having a measured sample spacing associated therewith, and using cosine estimation at the measured sample spacing for determining amplitudes associated with frequencies uniquely associated with features of the spectral data in the plurality of measured samples. The method further comprises selectively producing broadband spatial images of the scene from the electromagnetic radiation received from the scene by the spectrometer by selectively controlling the interferometer to prevent formation of the interference pattern at the focal plane array sensor, and producing the broadband spatial images using the focal plane array sensor.

In one example, the interferometer includes a movable mirror positioned in one arm of the interferometer and scanning movement of the movable mirror over a scan range results in formation of the interference pattern at the focal plane array sensor, and selectively controlling the interferometer to prevent formation of the interference pattern includes halting the scanning movement of the movable mirror, and applying random vibration to the movable mirror. In one example, halting the scanning movement of the movable mirror includes moving the movable mirror to a zero path difference position in the scan range and halting the scanning movement of the movable mirror at the zero path difference position.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

There are numerous applications in which it may be desirable to obtain both broadband spatial imagery and spectral data of a scene. For example, some spectral sensors, such as infrared interferometric spectrometers using uncooled microbolometer focal plane arrays, may scan slowly, with a single scan of a scene taking several seconds to complete. Therefore, it may be desirable for a user to more quickly obtain a spatial image of the scene, and optionally perform spectral imaging to identify targets within the spatial image of the scene, or obtain additional information about this scene. Conventionally, this is achieved using two instruments, namely an imager (camera) and a spectrometer. Aspects and embodiments are directed to an imaging transform spectrometer capable of dynamically switching between an interferometric spectrometer function and a broadband spatial imaging function to allow both types of information to be gathered on demand from a scene, using a single instrument. In particular, as discussed in more detail below, aspects and embodiments provide an imaging transform spectrometer (ITS) in which the modulation used for interferometric imaging may be dynamically turned ON and OFF to select a desired mode of operation for the instrument.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1A:
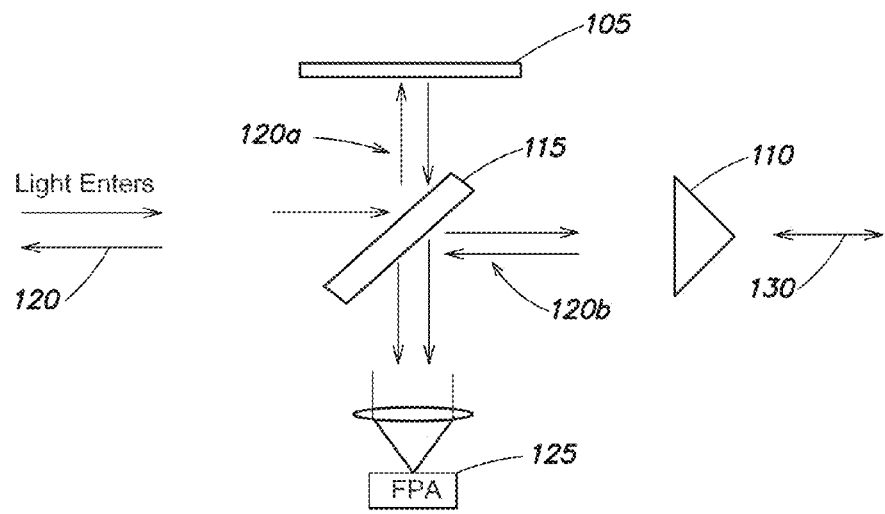
FIG. 1A is a block diagram of one example of a conventional interferometric spectrometer.
Figure 1B:
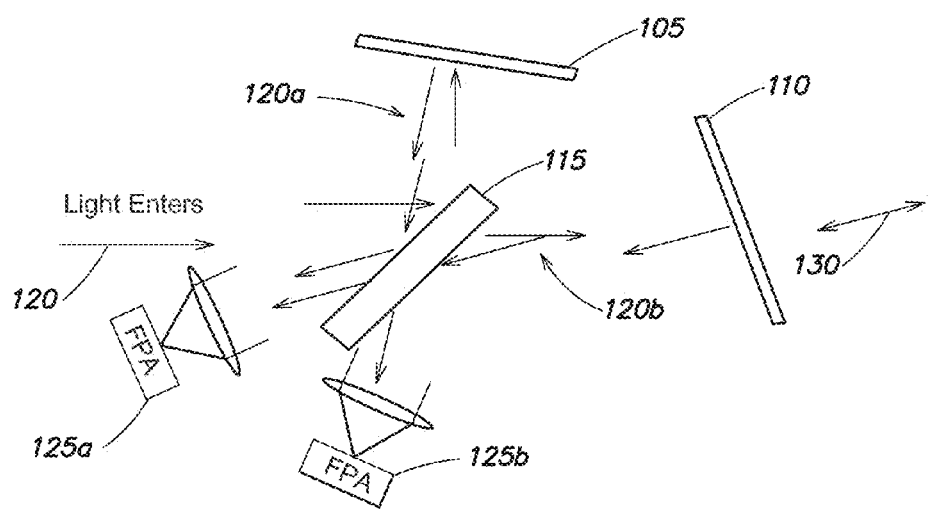
FIG. 1B is a block diagram of another example of a conventional interferometric spectrometer.
Figure 2:
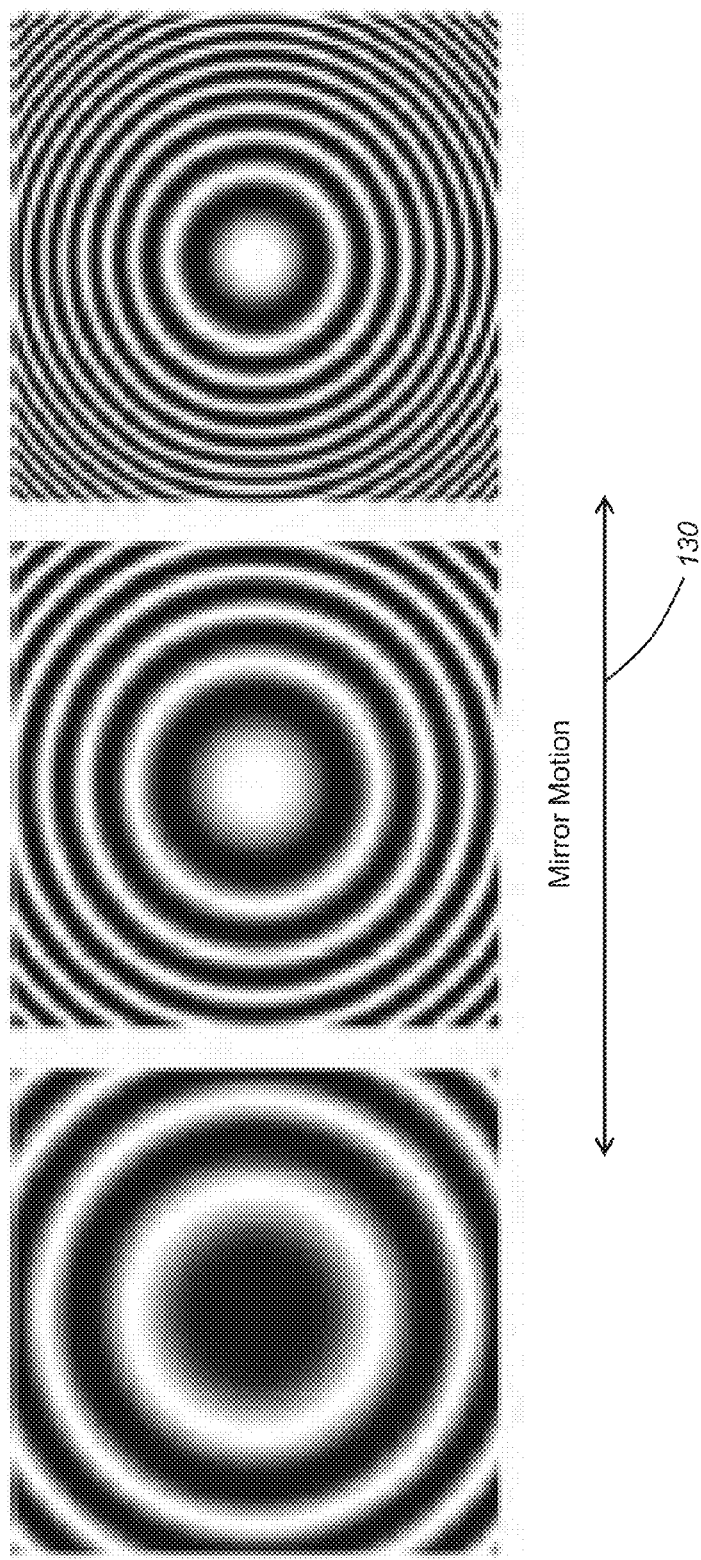
FIG. 2 is a diagram illustrating an example of the variability of interference fringes as a function of mirror position when the input is a monochromatic source.

The Fourier transform spectrometers of either FIG. 1A or FIG. 1B collect a sequence of image frames from the radiation 120 and perform a transform, typically a DFT or FFT as discussed above, to the time sequence of frames measured at each pixel to produce an interferogram. The spectral data of interest may be encoded in superposition of cosinusoids of many frequencies that are sampled at each pixel in the focal plane array and then transformed. The amplitude of each cosinusoid corresponds to the power at a spectral wavelength (or wavenumber). Instantaneously, the resulting interferogram produced by the spectrometer is a spatial fringe pattern, as shown in FIG. 2, that varies on any given pixel as a position of the moving mirror 110 (which controls the optical path length difference between the two arms of the interferometer). In the example illustrated in FIG. 2, the image is of a background of constant intensity emitting energy at a single wavelength, and hence a pattern of black and white concentric rings is produced. Those skilled in the art will appreciate, that when imaging an actual scene with spectral features, the image would have variation in intensity over its lateral extent, corresponding to the modulation pattern, rather than concentric black and white circles as in the example of FIG. 2. Thus, using a conventional imaging spectrometer the external scene is continuously imaged, but the image produced is highly modulated.

According to one embodiment, the interferometric spectral analysis function of an imaging transform spectrometer is selectively disabled by stopping the motion of the movable mirror and "destroying" the spatial interferogram by randomly modulating the optical path difference. Deliberately destroying the interferogram is highly counterintuitive in the context of an imaging transform spectrometer, because conventionally, significant effort is put into creating and maintaining the interferogram precisely in accord with the imaging parameters or specifications for a particular instrument. Furthermore, merely stopping the motion of the movable mirror 110 without taking additional action does not produce an easily usable or "pristine" spatial image. Rather, even when the movable mirror is stopped, a spatially varying pattern is overlaid on the scene such that the image obtained is modulated by the pattern of the interferogram. Thus, referring to FIG. 2, for example, the white regions contain image information, but the black regions correspond to regions where the image information has been lost due to the interferometric pattern. However, according to aspects and embodiments disclosed herein, it has been recognized that by selectively removing the interferometric function of the imaging transform spectrometer without disrupting the optical alignment and/or properties of the optical train, such that the interferometric functions can be quickly switched back ON, broadband spatial imaging of a scene may be obtained without the need for a second instrument.

Figure 3:
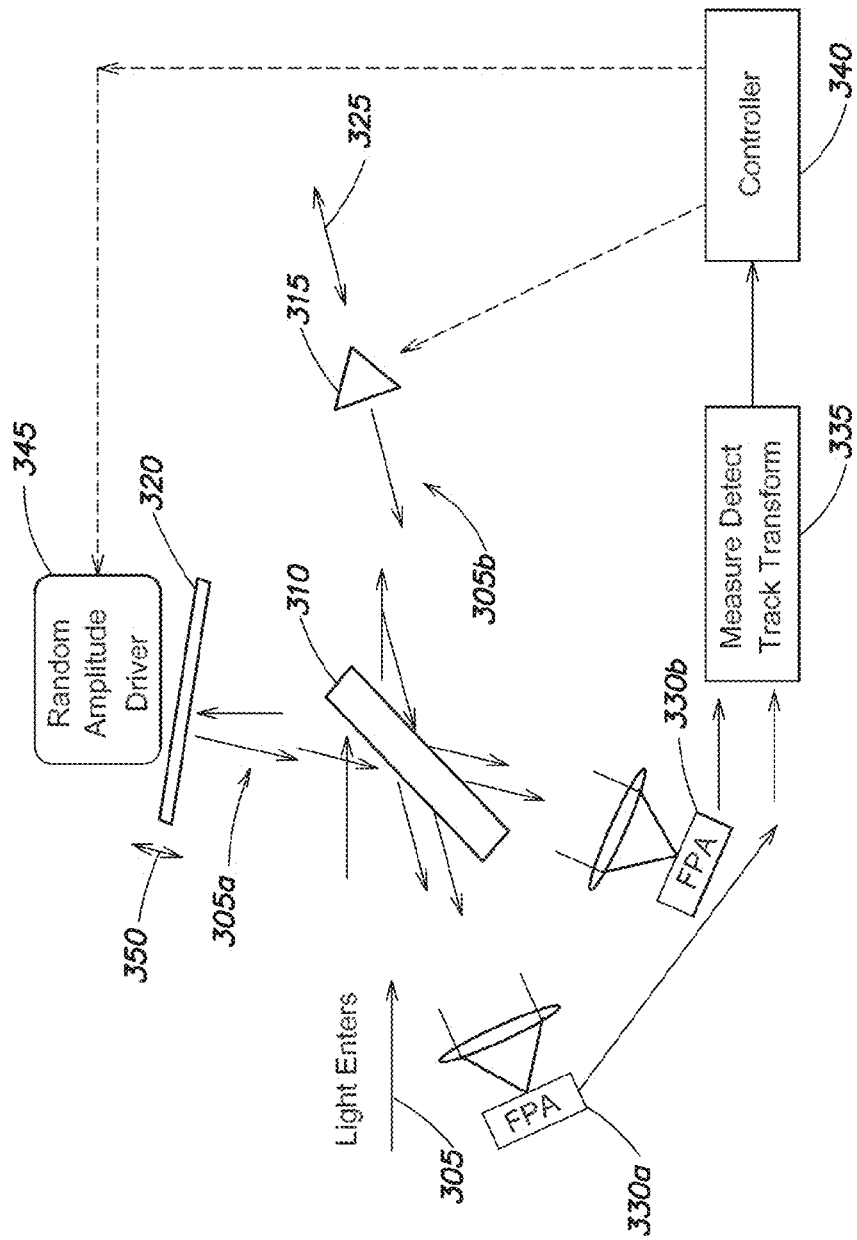
FIG. 3 is a block diagram of one example of an imaging transform spectrometer according to aspects of the present invention.

Referring to FIG. 3, there is illustrated a block diagram of one example of an imaging transform spectrometer with broadband spatial imaging capability according to one embodiment. Radiation 305 from an external scene enters the spectrometer and is split between two optical paths (two "arms" of the spectrometer) using a beamsplitter 310. Radiation propagates down each of the two arms and is reflected off one of two mirrors 315, 320. The beamsplitter 310 is an optical element configured to allow part of an electromagnetic wave to pass through while reflecting the other part. As discussed above, one arm of the interferometer introduces a variable optical path length through movement of a movable mirror 315. A fixed mirror 320 is used to reflect the radiation 305a in the other arm. In one example, lateral movement of the movable mirror 315 along the axis of the corresponding arm, as shown by arrow 325, produces the optical path length difference (OPD). The movable mirror scans over a range of movement along the axis indicated by arrow 325, from an initial position to a furthest lateral extent, and back. The movable mirror 315 may be a corner cube, a plane mirror, or another reflecting device. In the illustrated example, the radiation 305a and 305b returned from each arm is directed via the beamsplitter 310 to two focal plane array (FPA) sensors 330a, 330b, and the beams from each path are recombined at the FPA sensors. The result of the recombination is an interferogram produced at the FPA sensors 330a, 330b, as discussed above. Each FPA sensor 330a, 330b may include a set of photo-detector elements and corresponding electronics arranged at or near the focus of the interference pattern. For example, the set of photo-detectors elements can be arranged as a linear array or in a two-dimensional matrix. An analyzer 335 receives data from the FPA sensors 330a, 330b and processes the data to produce images. The analyzer 335 may perform various acts necessary for operation of the imaging transform spectrometer, including performing transforms, such as a DFT or FFT in some examples, on the data to produce spectra, and displaying the spectra for viewing by an operator, for example.

According to one embodiment, in order to halt spectral collection and switch the imaging transform spectrometer into a broadband spatial imaging mode, the scanning motion of the movable mirror 315 is stopped, and one of the two mirrors 315, 320 is physically modulated to destroy the interferogram. In one embodiment, a controller 340 is coupled to the movable mirror 315 and configured to stop the scanning motion of the mirror on demand. The controller 340 may be implemented together with the analyzer 335 or may be a separate component from the analyzer. The imaging transform spectrometer further includes a random amplitude driver 345 which may be coupled to either the fixed mirror 320 or the movable mirror 315, and to the controller 340. The random amplitude driver causes the mirror 315 or 320 to which it is coupled to vibrate rapidly back and forth along the direction of the radiation 305a or 305b, respectively (represented by arrows 325 and 350, respectively), with a small amplitude motion. This vibration causes a random variance to the OPD for the radiation striking the mirror 315 or 320. In one example, amplitude of the vibration of the mirror 315 or 320 is greater than one wavelength at the longest wavelength of the radiation 305, and preferably greater than or equal to a few wavelengths. As a result of stopping the scanning motion of the movable mirror 315, and the random rapid vibration of either mirror 315 or 320, the interference pattern is substantially destroyed, and the resulting image obtained by the FPA sensors 330a and 330b is a broadband image of the scene without modulation.

Figure 4:
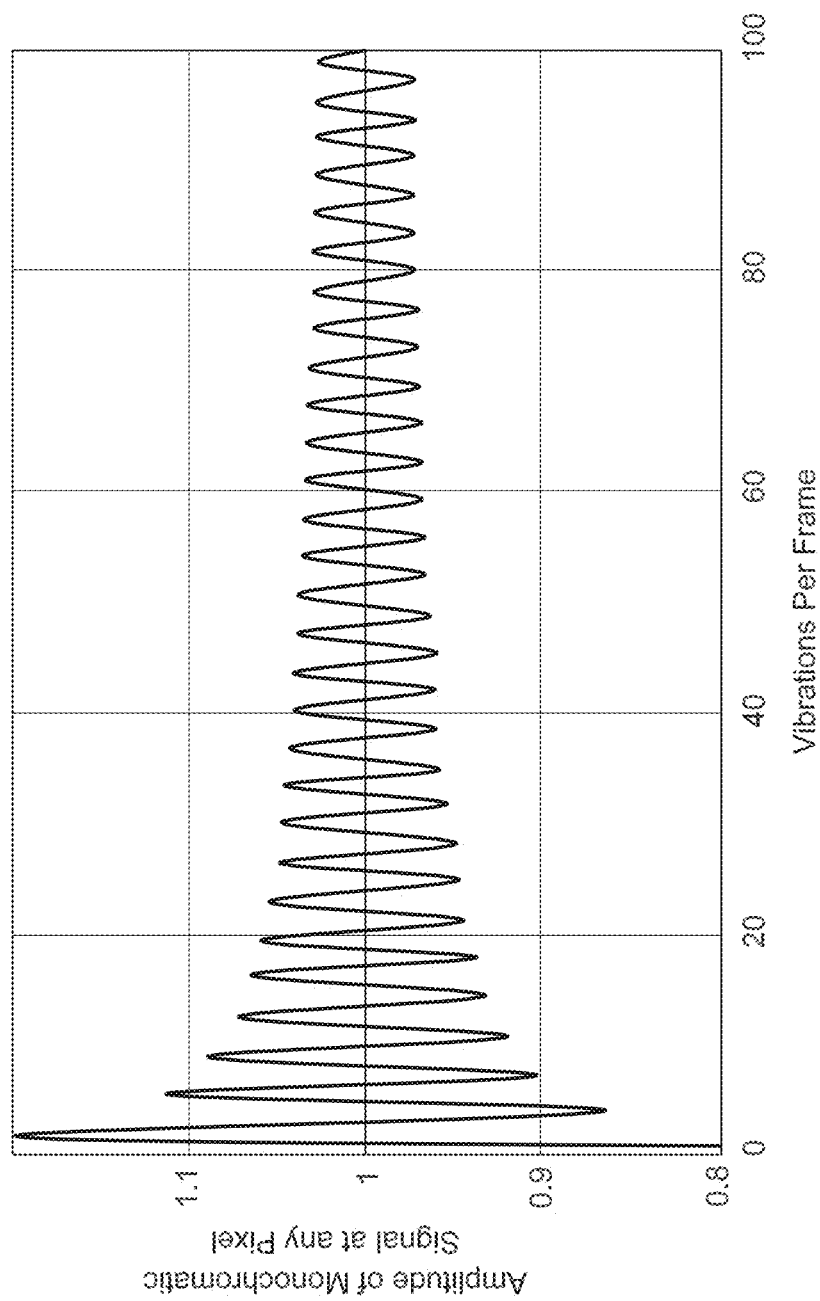
FIG. 4 is a graph of an example of the relative amplitude of a fringe as measured at any given pixel when the input to the interferometer is a monochromatic source as a function of the number of random vibrations per frame of the fixed or movable mirror in the imaging transform spectrometer of FIG. 3.

FIG. 4 is a graph illustrating the amplitude of a monochromatic signal at any pixel in either FPA sensor 330a or 330b as a function of the number of cycles of vibration of either mirror 315 or mirror 320 within one focal plane frame time. The FPA sensors 330a and 330b may take many frames of an image during a scan of the movable mirror 315 from its initial position to its furthest position, and back. As may be seen with reference to FIG. 4, vibrating either mirror 315 or mirror 320 several times during a frame time of the FPA sensor 330a or 330b significant reduces the modulation. For example, vibrating the mirror 315 or 320 more than 5 times for a frame time reduces the modulation to approximately 5%, and increasing rapid vibration further reduces the modulation to less than about 2% for each color. Each color in the scene is modulated a few percent. The pattern illustrated in FIG. 4 may be essentially the same for each color/wavelength, but shifted horizontally for the different wavelengths. Although it may not be practical to obtain exactly zero modulation for a monochromatic signal, the signal from a scene is typically broadband, containing many colors. The small remaining modulation for each color may be random in amplitude and variable in sign, due to the shift for different wavelengths, such that the modulation for the broadband signal averages to approximately zero in general.

Thus, the imaging transform spectrometer may be switched between an interferometric mode, in which the spectrometer may operate substantially similarly to a conventional imaging transform spectrometer to perform spectral imaging of a scene, and a camera mode in which the spectrometer is configured to obtain broadband spatial images of the scene by removing or destroying the interferogram used for spectral imaging. As discussed above, in one embodiment, the mode switching may be controlled or implemented by the controller 340 which is configured to halt the scanning motion of the movable mirror 315 and direct the random amplitude driver 345 to impart a rapid vibration to either mirror 315 or mirror 320 to remove modulation of the image of the scene and allow a "pristine" (or nearly so) broadband spatial image to be obtained. The controller may also control the random amplitude driver 345 to halt the vibration of mirror 315 or 320, and restart the scanning movement of the movable mirror 315 in order to return the spectrometer to the spectral imaging (interferometric) mode. It will be appreciated by those skilled in the art, given the benefit of this disclosure, that although FIG. 3 illustrates a dual-FPA embodiment of an imaging transform spectrometer, aspects and embodiments disclosed herein are not limited to the spectrometer configuration shown in FIG. 3. The principles of "turning OFF" the spectral imaging function of the imaging transform spectrometer by halting the scanning movement of the movable mirror 315 and imparting a rapid vibration to either mirror 315 or mirror 320 may be applied to other spectrometer configurations, including, for example, embodiments of the single FPA configuration illustrated in FIG. 1A.

As discussed above, one example of an imaging transform spectrometer is the Fourier transform spectrometer. Aspects and embodiments discussed herein, including the on-demand configuring of the spectrometer between the spectral imaging mode and the broadband spatial imaging (camera) mode may be applied to Fourier transform spectrometers. However, the image processing associated with the Fourier transform spectrometer relies on uniformly spaced samples to be taken from each pixel in the FPA sensor in order to produce an image with good quality. Non-uniformly spaced input samples result in artifacts in the spectra when the DFT/FFTs are applied to the samples. To better enable on-demand switching of the spectrometer between the spectral imaging mode and the camera mode, the scan of the movable mirror 315 may be halted, and then restarted, at any time or position during the scan. This may result in non-uniform spacing of the input samples when the spectrometer is switched back into the spectral imaging mode, resulting in degradation of the image quality. Alternatively, complex control and/or processing may be required to control the sample spacing or handle non-uniformities in the sample spacing. Accordingly, in certain embodiments, rather than using a Fourier transform spectrometer, another form of an imaging transform spectrometer is used in which the scanning motion of the movable mirror 315 is tracked, and knowledge of the mirror position is used to transform the signal amplitude from each pixel.

In particular, according to one embodiment, an imaging transform spectrometer configuration is used in which an interferometric spectrometer is combined with dynamic knowledge of the interferometer mirror position and settings, along with particular signal processing to extract spectral features from an interferogram without the need to precisely control the variable arm, with the ability to optimally control the number of, spacing of, and band centers of extracted spectra, with greater spectral range than conventional Fourier transform spectrometers and with less susceptibility to artifacts resulting from imperfect sample spacing. Examples and embodiments of such an imaging transform spectrometer are described in commonly-owned U.S. Pat. No. 8,203,715, which is herein incorporated by reference in its entirety. Thus, in one embodiment, the analyzer 335 and/or controller 340 may be configured to measure the optical path difference, and optionally tilt, of the interferometer and use the information on the position of the interferometer to select the centers of samples that will be used to generate the interferogram.

Figure 5:
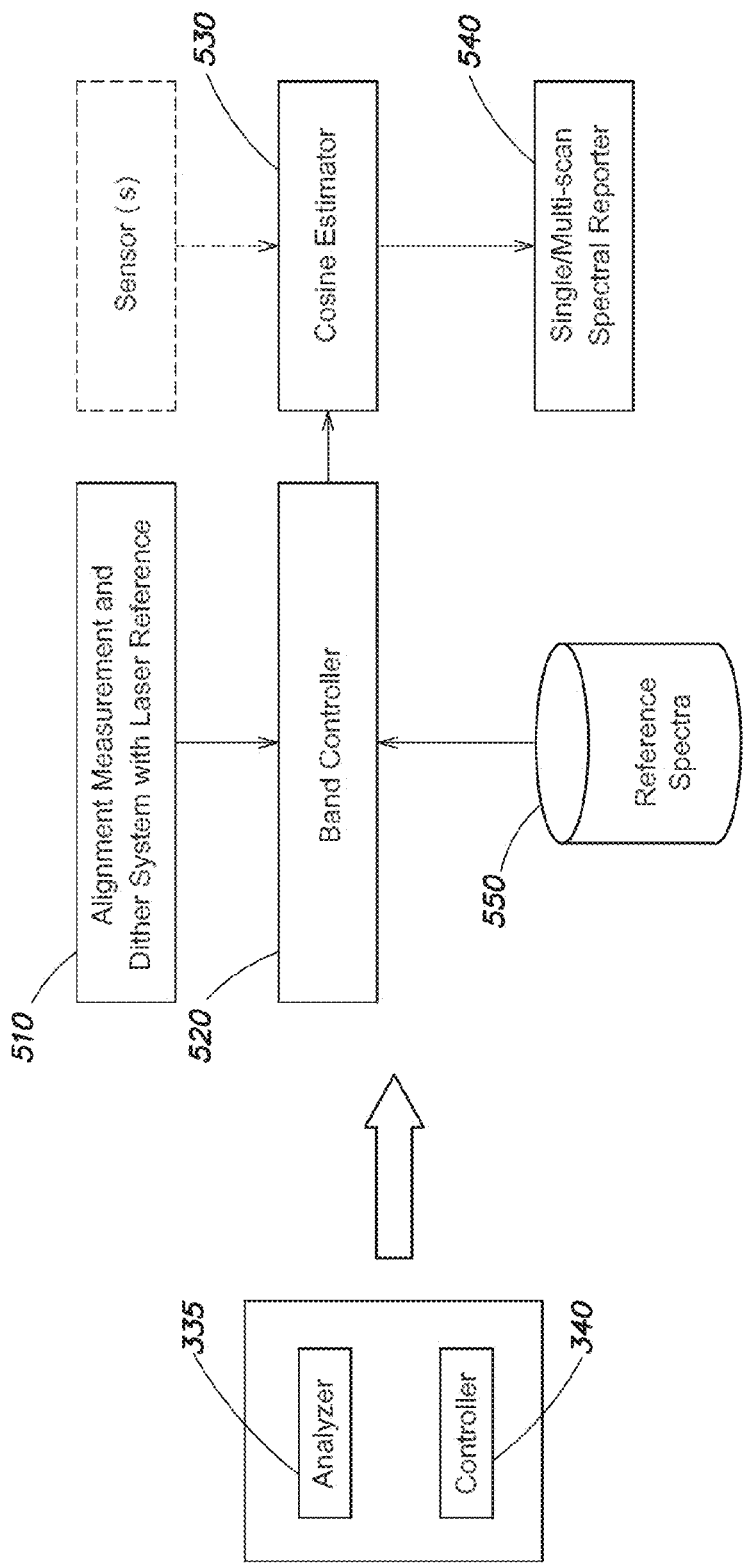
FIG. 5 is a block diagram of certain components of an imaging transform spectrometer according to aspects of the invention.

Referring to FIG. 5, the analyzer 335 and controller 340 separately or together may include an alignment measurement and dither system 510, a band control module 520, a cosine estimator 530, and a spectral reporter 540. As described in U.S. Pat. No. 8,203,715, the optical path difference and (optionally) the tilt of the interferometer are measured by the alignment measurement and dither system 510 and then transmitted to the band control module 520. The band control module 520 uses the information on the position of the interferometer to select the centers of samples that will be used in the cosine estimation module 530. The modulation of the interferogram may also be measured and sent to the band control module 520. The band control module 520 computes an instrument line shape (ILS) according to the tilt, modulation, and jitter as measured in the system. A series of cosine estimations is performed by the cosine estimation module 530 to assess the ILS to determine whether any secondary signals, such as harmonics, ghosts, etc., have been produced. The modulation of the interferogram may be corrected, as described in U.S. Pat. No. 8,203,715. The band control module 520 is configured to read spectral data from a spectral reference database 550. The reference spectra are convolved with the ILS, and the output of the convolution is used by the band control module 520 to select band centers for cosine estimation. These band centers may be anywhere in the spectral range of the focal plane array sensor(s) 330. Once the band centers are selected, then the cosine estimation module 530 is configured to use one of a family of techniques to estimate the amplitude of the cosinusoid at that frequency. The techniques include a linear or non-linear least-squares analysis and digital heterodyning. In the digital heterodyning technique, two orthogonal cosines that are 90 degrees out of phase are multiplied with the measured interferogram samples. The products are essentially correlation coefficients and are, in turn, added in quadrature to complete the estimate of the amplitude. In this approach, the cosinusoids are compared at the known (measured) optical path difference sample spacing. Thus, only knowledge, rather than control, of the sampling is needed.

Thus, according to aspects and embodiments, the imaging transform spectrometer may be configured to track the scanning motion of the movable mirror 315, and use knowledge of the mirror position to sample and transform the amplitude of the signal received from each pixel of the sensors 330. The controller 340 may be further configured to ignore, and/or direct the analyzer 335 to ignore, image frames with vibration, namely those image frames taken when the random amplitude driver is operational, since these frames will not contain information useful for spectral imaging. The controller 340 may dynamically (either automatically or under control of an operator) configure the imaging transform spectrometer to interleave any number of broadband spatial images of the scene with spectral collection, as desired.

As will be appreciated by those skilled in the art, there is a certain position within the scanning movement range of the movable mirror 315 at which there will be no, or essentially no, difference in the optical path length of the two arms of the interferometer. When the movable mirror 315 is at this "zero path difference" position, no interferogram is produced because there is no phase difference between the signals received at the focal plane array sensor(s) 330 from each path. According to another embodiment, rather than vibrating one of the mirrors 315, 320 to destroy the interferogram, the movable mirror 315 may rapidly returned to the zero path difference position to allow the spectrometer to take broadband spatial images of the scene. The controller 340 may be configured to ignore, and/or direct the analyzer 335 to ignore, image frames collected during the transition into the spatial imaging mode (i.e., travel of the movable mirror 315 to the zero path difference position) and while the spectrometer is in the spatial imaging mode, since these frames will have no interferogram and therefore not contain information useful for spectral imaging.

It some circumstances, the zero path difference position of the movable mirror 315 may not be accurately known. For example, the zero path difference position may change due to temperature variations or other changing environmental conditions. Accordingly, in one embodiment, the controller 340 may be configured to adaptively determine the correct position of the movable mirror 315 that allows the imaging transform spectrometer to obtain broadband spatial images (i.e., the position where little or no interferogram is produced at the sensor(s) 330).

According to other embodiments, the techniques discussed above of returning the movable mirror 315 to approximately the zero path difference position may be combined with adding vibration to either the fixed mirror 320 or the movable mirror 315 to destroy any residual interference pattern. As discussed above, in some circumstances the zero path difference position of the mirror may not be accurately known; however, it may be possible to know or determine the approximate position. Accordingly, the controller 340 may cause the movable mirror 315 to be moved to the approximate zero path difference position, and then control the random amplitude driver 345 to vibrate one of the mirrors 315, 320 as discussed above. It may be easier, for example, require less rapid vibration, to destroy the interferogram if the movable mirror 315 is close to the zero path difference position, because the inherent contrast in the image is smaller. Therefore, it may be beneficial to combine moving the movable mirror 315 to the region of the zero path difference position and applying vibration to one of the mirrors.

Thus, aspects and embodiments provide techniques by which an imaging transform spectrometer may be configured, on demand, into either a spectral imaging mode or a camera mode through purposeful, selective destruction of the interference pattern used for spectral imaging. As discussed above, the spectrometer may be configured to perform interleaved collection of modulated interferogram images and substantially unmodulated broadband spatial images. In other words, spectral collection may be interrupted, on demand or at any time, to collect broadband unmodulated images, and then scanning may be resumed to improve spectral resolution and/or avoid aliasing of samples. As discussed above, in certain embodiments, the interferometer scan may be interrupted when the movable mirror 315 is at or near the zero path difference position to collect broadband images. In some examples, the interferometer scan may be interrupted at a selected point in time (corresponding to a selected position x of the movable mirror in its scan range), the movable mirror may be rapidly moved to (or near to) the zero path difference position for broadband image collection, and then rapidly returned to position x to resume spectral collection. Reconstruction of the interrupted interferogram scan may be accomplished using knowledge of the movable mirror position, as discussed above, such that precise spacing between samples in the scan and precise control of the optical path difference may not be necessary.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multimode imaging transform spectrometer having a spectral collection mode and a camera mode and comprising:
   a beamsplitter configured to split incident electromagnetic radiation from a scene into a first optical path and a second optical path;

at least one focal plane array sensor configured to receive electromagnetic radiation from the first and second optical paths;

a first mirror positioned in the first optical path and configured to reflect electromagnetic radiation in the first optical path toward the at least one focal plane array sensor;

a movable second mirror positioned in the second optical path and configured to reflect electromagnetic radiation in the second optical path toward the at least one focal plane array sensor, the second mirror being movable over a scan range to provide an optical path length difference between the first optical path and the second optical path and produce an interferogram at the least one focal plane array sensor when the imaging transform spectrometer is in the spectral collection mode;

a random amplitude driver coupled to the controller and to one of the first mirror and the second mirror; and a controller configured to selectively interrupt and halt scanning movement of the second mirror over the scan range to configure the imaging transform spectrometer into the camera mode, the controller being further configured to control the random amplitude driver to impart a vibration to the one of the first mirror and the second mirror while the scanning movement of the second mirror over the scan range is halted to substantially prevent formation of the interferogram at the at least one focal plane array sensor;

wherein, in the camera mode, the at least one focal plane array sensor is configured to produce broadband spatial images of the scene from the electromagnetic radiation from the first and second optical paths.

2. The multimode imaging transform spectrometer of claim 1, wherein the at least one focal plane array sensor includes two focal plane arrays sensors each configured to receive the electromagnetic radiation from the first and second optical paths.

3. The multimode imaging transform spectrometer of claim 1, wherein the random amplitude driver is coupled to the first mirror.

4. The multimode imaging transform spectrometer of claim 1, wherein the random amplitude driver is coupled to the second mirror.

5. The multimode imaging transform spectrometer of claim 1, further comprising:

an analyzer coupled to the at least one focal plane array sensor and configured to receive image frames from the at least one focal plane array sensor and, in the spectral collection mode, to:

sample the interferogram to generate a plurality of measured samples having a measured sample spacing associated therewith; and using cosine estimation at the measured sample spacing to determine amplitudes associated with frequencies uniquely associated with features of spectral data in the plurality of measured samples.

6. The multimode imaging transform spectrometer of claim 5, wherein the controller is configured control the analyzer to ignore image frames received from the at least one focal plane array sensor when the imaging transform spectrometer is in the camera mode.

7. A multimode imaging transform spectrometer comprising:

a first focal plane array sensor;

a second focal plane array sensor;

a beamsplitter configured to split incident electromagnetic radiation from a scene into a first optical path and a second optical path;

a first mirror positioned in the first optical path and configured to reflect electromagnetic radiation in the first optical path toward each of the first focal plane array sensor and the second focal plane array sensor;

a movable second mirror positioned in the second optical path and configured to reflect electromagnetic radiation in the second optical path toward the first and second focal plane array sensors, the second mirror being movable over a scan range to provide an optical path length difference between the first optical path and the second optical path and produce an interferogram at each of the first and second focal plane array sensors;

a random amplitude driver coupled to one of the first mirror and the second mirror and configured to impart a vibration to the one of the first mirror and the second mirror;

an analyzer coupled to the first and second focal plane array sensors; and a controller coupled to the second mirror and to the random amplitude driver, and configured to selectively halt scanning movement of the second mirror over the scan range and to control the random amplitude driver to impart the vibration to the one of the first mirror and the second mirror while the scanning movement of the second mirror is halted, so as to substantially prevent formation of the interferogram at the first and second focal plane array sensors;

wherein, in the camera mode of the multimode imaging transform spectrometer in which the scanning movement of the second mirror is halted, the first and second focal plane array sensors are configured to produce broadband spatial images of the scene from the electromagnetic radiation in the first and second optical paths; and wherein, in a spectral collection mode of the multimode imaging transform spectrometer, analyzer is configured to produce spectral data from the interferograms produced at the first and second focal plane array sensors.

8. The multimode imaging transform spectrometer of claim 7, wherein the random amplitude driver is coupled to the first mirror.

9. The multimode imaging transform spectrometer of claim 7, wherein the random amplitude driver is coupled to the second mirror.

10. The multimode imaging transform spectrometer of claim 7, wherein to configure the multimode imaging transform spectrometer into the camera mode, the controller is further configured to move, within a spectral scan, the second mirror to a zero path difference position in which the optical path length difference between the first optical path and the second optical path is substantially zero, and to halt the scanning movement of the second mirror at the zero path difference position.

11. The multimode imaging transform spectrometer of claim 10, wherein the controller is further configured to adaptively determine the zero path difference position.

12. The multimode imaging transform spectrometer of claim 7, wherein the analyzer is configured to track the scanning movement of the second mirror, and in the spectral collection mode of the multimode imaging transform spectrometer, to use knowledge of a position of the second mirror in the scan range to analyze the interferogram produced at the first and second focal plane array sensors.

13. An imaging method comprising:
receiving, with a spectrometer, electromagnetic radiation from a scene, the spectrometer including an interferometer having a movable mirror positioned in one arm of the interferometer;
selectively producing spectral data from the electromagnetic radiation received from the scene by a spectrometer by:
selectively using the interferometer to form an interference pattern at a focal plane array sensor by scanning movement of the movable mirror over a scan range;
sampling, at the interferometer, the interference pattern to generate a plurality of measured samples having a measured sample spacing associated therewith; and
using cosine estimation at the measured sample spacing for determining amplitudes associated with frequencies uniquely associated with features of the spectral data in the plurality of measured samples; and
selectively producing broadband spatial images of the scene from the electromagnetic radiation received from the scene by the spectrometer by:
selectively controlling the interferometer to prevent formation of the interference pattern at the focal plane array sensor, including halting the scanning movement of the movable mirror and applying random vibration to the movable mirror; and
producing the broadband spatial images using the focal plane array sensor.

14. The imaging method of claim 13, wherein halting the scanning movement of the movable mirror includes moving the movable mirror to a zero path difference position in the scan range and halting the scanning movement of the movable mirror at the zero path difference position.

\* \* \* \* \*